United States Patent [19]

Koehr

[11] Patent Number: 5,588,694
[45] Date of Patent: Dec. 31, 1996

[54] ARRANGEMENT FOR INCREASING THE BUCKLING STRENGTH OF WINDSHIELD PILLARS OF A VEHICLE

[75] Inventor: Robert Koehr, Neustadt, Germany

[73] Assignee: Dr. Ing. h.c.F. Porsche AG, Weissach, Germany

[21] Appl. No.: 354,068

[22] Filed: Dec. 6, 1994

[30] Foreign Application Priority Data

Dec. 6, 1993 [DE] Germany ............... 43 41 499.0

[51] Int. Cl.⁶ ...................................... B60R 21/02
[52] U.S. Cl. .................. 296/188; 296/96.21; 280/756
[58] Field of Search ........................ 296/188, 96.21, 296/90; 280/756

[56] References Cited

U.S. PATENT DOCUMENTS

| | | | |
|---|---|---|---|
| 999,631 | 8/1911 | Martin et al. | 296/90 |
| 1,074,774 | 10/1913 | Collier | 296/90 |
| 3,829,153 | 8/1974 | Fussell, Jr. et al. | 296/96.21 X |

FOREIGN PATENT DOCUMENTS

| | | |
|---|---|---|
| 0189819 | 8/1986 | European Pat. Off. |
| 3427537 | 2/1986 | Germany ............... 296/188 |
| 3802520 | 1/1989 | Germany. |

*Primary Examiner*—Joseph D. Pape
*Attorney, Agent, or Firm*—Evenson, McKeown, Edwards & Lenahan, P.L.L.C.

[57] ABSTRACT

An arrangement for increasing the buckling strength of windshield pillars of a vehicle, particularly of the very inclined windshield pillars of a convertible, includes a supporting strut which interacts with an activating device. In its deposited position, the strut is aligned approximately horizontally and extends along an upper area of a side vehicle door having an inside door panel. In the event of danger, an end of the strut facing the windshield pillar is moved by an activating device into an operative position along a guide rail to an upper end area of the windshield pillar. The supporting strut, in its deposited position, is detachably fastened on an impression of the vehicle door facing the passenger compartment, whereas, in the swivelled-up position and in its operative position, the supporting strut is completely uncoupled from the vehicle door and, in the operative position, is on the one side connected in a force-transmitting manner with the upper end area of the windshield pillar and, on the other side with a receiving device which is arranged adjacent to the vehicle door and is fixed on the body side.

12 Claims, 8 Drawing Sheets

ARRANGEMENT FOR INCREASING THE BUCKLING STRENGTH OF WINDSHIELD PILLARS OF A VEHICLE

BACKGROUND AND SUMMARY OF THE INVENTION

Invention relates to an arrangement for increasing the buckling strength of windshield pillars of a vehicle and, more particularly, to an arrangement for increasing the buckling strength of the windshield pillars of a convertible which are very inclined. The arrangement includes at least one supporting strut which interacts with an activating device and extends approximately in the longitudinal direction of the vehicle. The supporting strut is aligned approximately horizontally in its deposited position and extends in an upper area of a lateral vehicle door having an inside door panel. However, in case of danger, an end of the supporting strut facing the windshield pillar is moved upwards by the activating device along a guide rail on the windshield pillar to its upper end area into an operative position.

A known arrangement of the above-mentioned type described in German Patent document DE 34 27 537 A1 provides a supporting strut which interacts with an activating device. The supporting strut extends approximately in the longitudinal direction of the vehicle and is aligned approximately horizontally in its deposited position. The supporting strut is provided in a hollow space of a vehicle front door, the hollow space being formed between an outside door panel and an inside door panel. The activating device is formed by a servo mechanism which, in case of danger, moves the supporting strut from the deposited position into a swivelled-up operative position. On the windshield pillar, a guide rail is mounted in which the end of the supporting strut facing the windshield pillar is guided during the upward swivelling. In the operative position, one end of the supporting strut is connected in an articulated manner with a door reinforcement arranged within the hollow space of the vehicle door, whereas the other end of the supporting strut is connected with an upper end area of the windshield pillar.

This known arrangement is disadvantageous because a relatively large installation space is required within the hollow space in the transverse direction of the vehicle for housing the supporting strut, the activating device and the separate tube-shaped door reinforcement laterally next to the door window pane. Consequently, the vehicle door must have a relatively wide construction, whereby the possible designs for the vehicle door are considerably limited. Together, the above-mentioned components also have a relatively high weight. In order to ensure that the arrangement functions, the vehicle door must have a relatively wide outlet gap formed in the area of its belt line through which the supporting strut is guided in case of danger. In the deposited position of the supporting strut, this gap must be sufficiently sealed off in order to largely prevent water from penetrating into the hollow space of the door from the door window pane.

Since the known arrangement is connected with the vehicle door in the deposited position as well as in the operative position, it is a disadvantage that it may be hard to open the vehicle door after a rollover of the vehicle.

There is therefore needed an arrangement for increasing the buckling strength of windshield pillars of a vehicle which functions well and has a simple construction and a low weight. The arrangement should also allow the vehicle door to easily be opened up after a vehicle rollover, as well as not limit the free design of the vehicle door.

These needs are met according to the present invention, by an arrangement including at least one supporting strut which interacts with an activating device and extends approximately in the longitudinal direction of the vehicle. The supporting strut is aligned approximately horizontally in its deposited position and extends in an upper area of a lateral vehicle door having an inside door panel. However, in case of danger, an end of the supporting strut facing the windshield pillar is moved upwards by the activating device along a guide rail on the windshield pillar to its upper end area into an operative position. The supporting strut, in its deposited position, is detachably fixed on an impression of the vehicle door facing the passenger compartment. The supporting strut is completely uncoupled from the vehicle door in the swivelled-up position and the operative position, and in the operative position, the strut is, on one side, connected in a force-transmitting manner with an upper end area of the windshield pillar and, on the other side, connected in a force-transmitting manner with a receiving device which is arranged adjacent to the vehicle door and is fixed at the body side.

The principal advantages achieved by the present invention are that, as a result of the detachable arrangement of the supporting strut in its deposited position on a step-shaped impression of the vehicle door facing the passenger compartment, the free design of the vehicle door is not limited. The hollow space between the inside door panel and the outside door panel for receiving the door window pane does not have to be enlarged, and the outlet gap for the door window pane may be constructed in a conventional manner. In its deposited position, the supporting strut is covered by a swivellable section of the interior lining of the door and, therefore, has no disturbing influence on the appearance.

According to another embodiment, the supporting strut is provided with a shell which is adapted to the shape of the step-shaped impression and the inner lining of the door. In the case of this embodiment, the supporting strut virtually forms an upper end area of the interior door lining. In addition, in its deposited position and when the vehicle door is closed, the supporting strut forms a lateral door reinforcement in case of a side crash.

The supporting strut is detachably connected with the vehicle door and is uncoupled from it during an upward swivelling into an operative position. As a result, also after a rollover of the vehicle, the vehicle doors can be opened in a simple and fast manner.

In the operative position, the supporting strut is connected in a force-transmitting manner with an upper end area of the windshield pillar and a stationary receiving device arranged adjacent to the vehicle door. By means of the two lateral supporting struts and the firm connection with the transversely extending upper pane frame or the body-side receiving devices, a stabilization of the vehicle body takes place against lateral forces, i.e., triangular cross-bracing.

In case of danger, that is, after the triggering of a sensor, the supporting strut is moved by the activating device into a first tube section of the receiving device. In case of a spurious triggering of the sensor, the supporting strut can be returned to its deposited position in a simple manner. In the case of a rollover and, therefore, an effect of force from above onto the windshield pillar, the supporting strut is moved into a second tube section of the receiving device which has a smaller diameter than the outside diameter of the supporting strut. By expanding the second tube section, energy is absorbed in an effective manner. A stop arranged in the second tube section limits the penetration movement of the supporting strut into the receiving device. By means of the detachable fastening of the receiving device on the vehicle body, this receiving device may be removed in a simple manner and may be replaced by a new one.

Other objects, advantages and novel features of the present invention will become apparent from the following detailed description of the invention when considered in conjunction with the accompanying drawings.

DETAILED DESCRIPTION OF THE DRAWINGS

Figure 1:
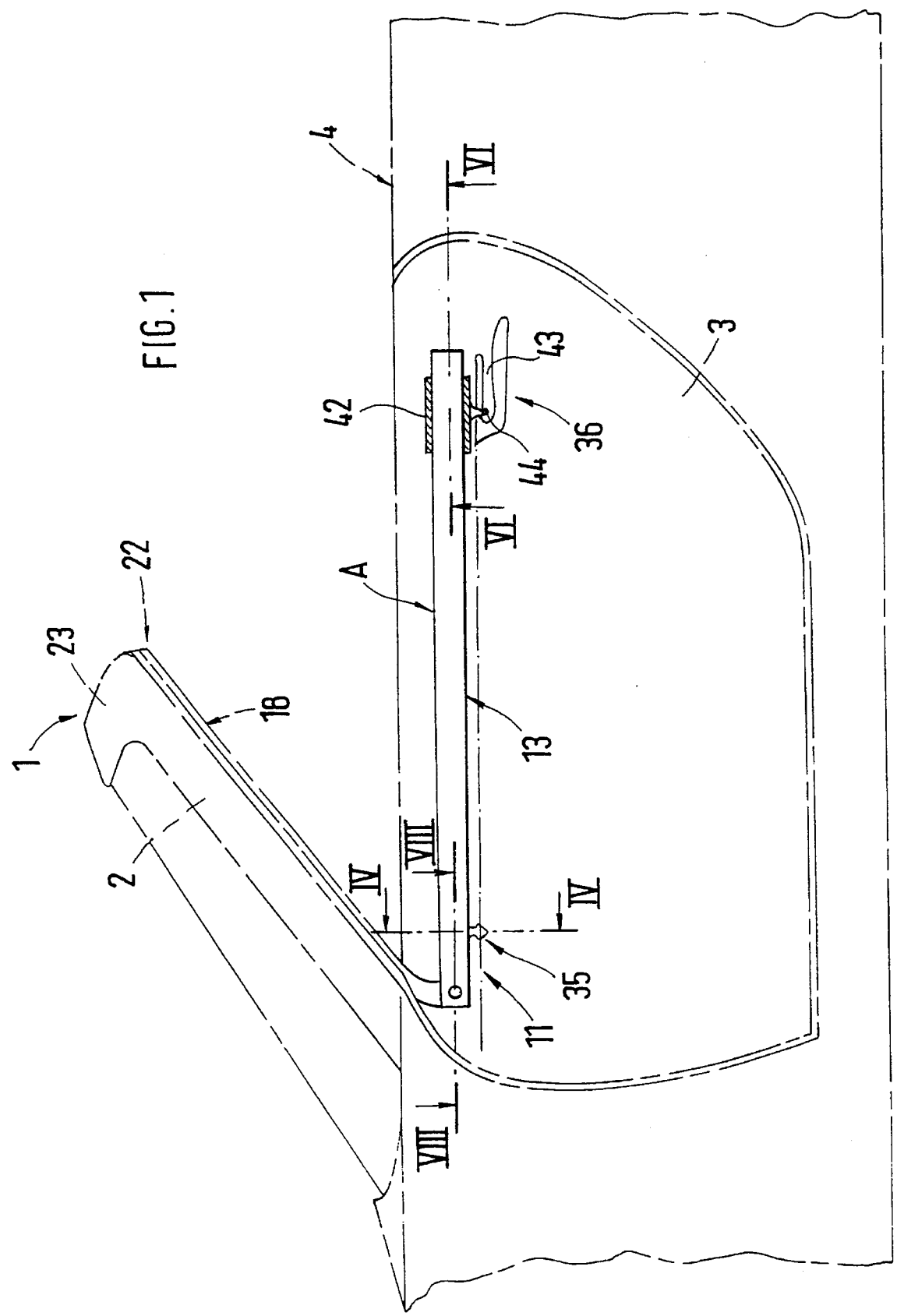
FIG. 1 is a partial lateral view of a motor vehicle with an arrangement for increasing the buckling strength of the windshield pillars being an inoperative position or deposited position A.
Figure 4:
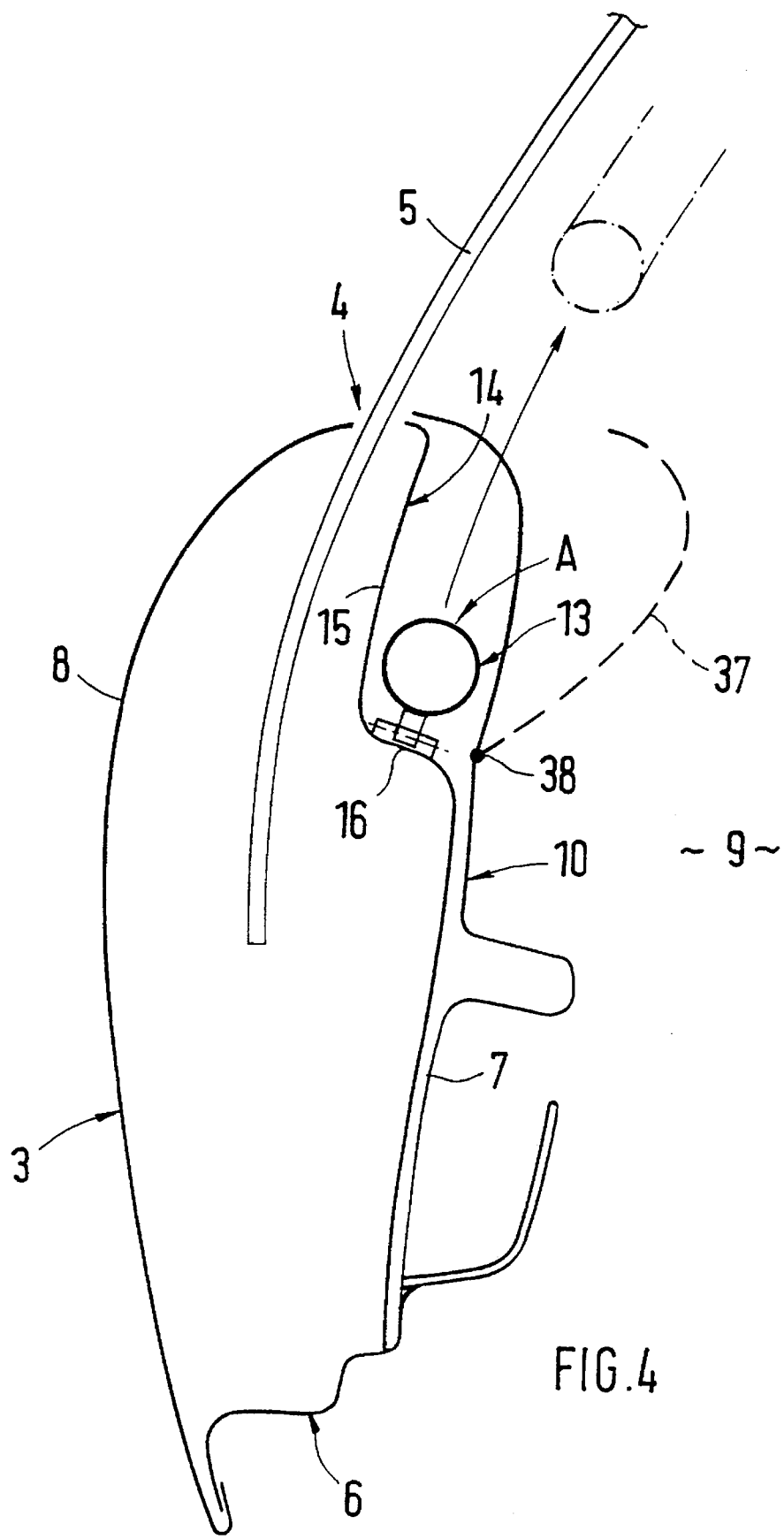
FIG. 4 is an enlarged sectional view taken along Line IV—IV of FIG. 1 with a first embodiment of the supporting strut.
Figure 5:
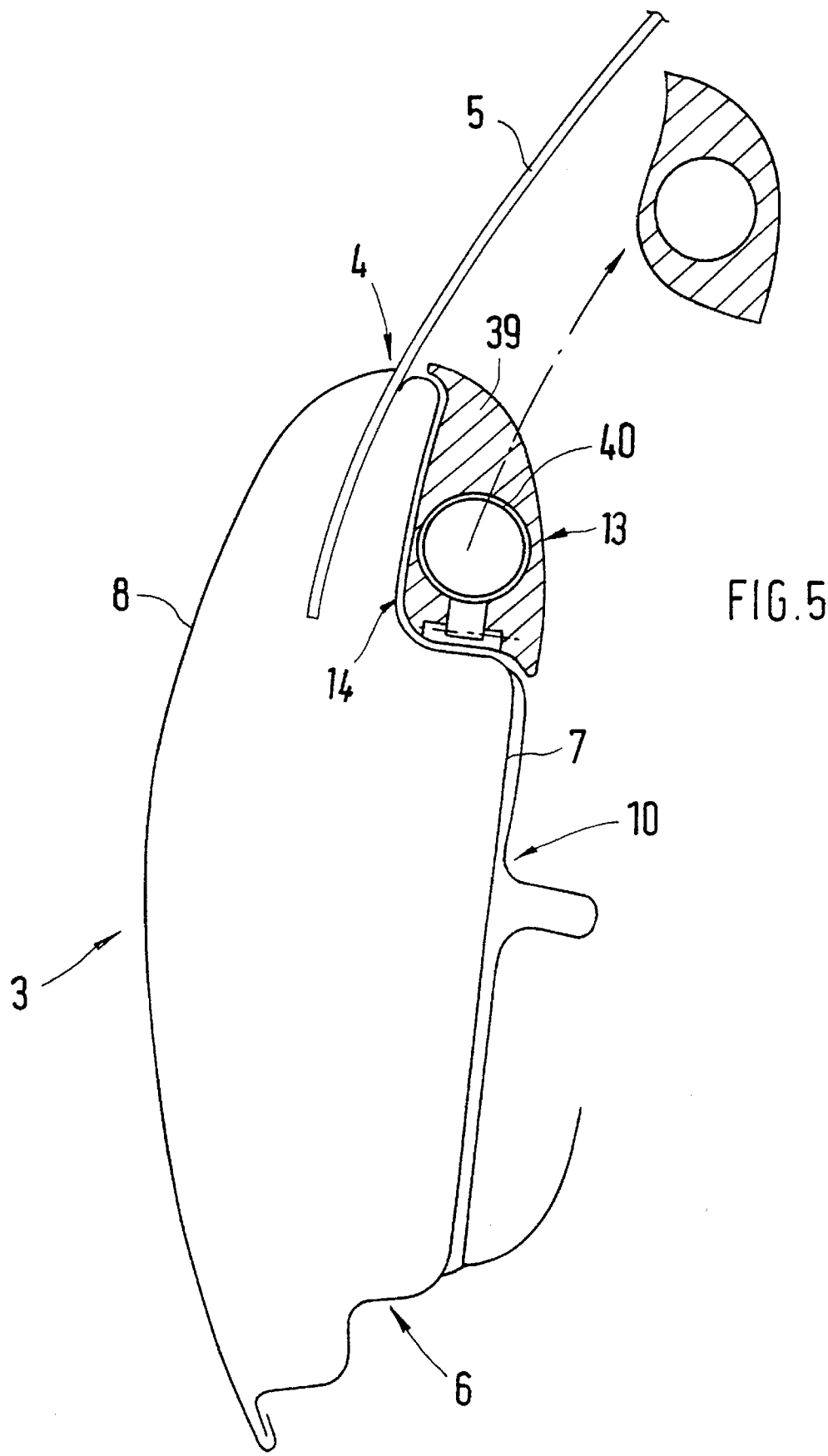
FIG. 5 is a sectional view according to FIG. 4 of another embodiment of the supporting strut.

Referring to FIG. 1, a partial area of a vehicle is shown which is formed by a convertible 1 having a relatively extensively inclined windshield pillar 2 and a front vehicle door 3. Above a belt line 4 of the vehicle, the vehicle door 3 is constructed without a frame and surrounds a vertically adjustable door window pane 5 (FIGS. 4 and 5). The door window pane 5 is received inside a hollow space of a door body 6 in its lowered position. In a conventional manner, the door body 6 (FIGS. 4 and 5) includes an inside door panel 7 and an outside door panel 8. The two door panels 7, 8 are firmly connected with one another in a partial area of their circumference.

On the side of the door facing a passenger compartment 9, the vehicle door 3 is provided with an interior door lining 10 which, in a locally detachable manner, is connected with the inside door panel 7 (FIGS. 4 and 5).

For increasing the buckling strength of the windshield pillars 2 in the event of a vehicle rollover, an arrangement 11 is provided. The arrangement 11 essentially includes an activating device 12 (FIG. 11) and a supporting strut 13 which interacts with this activating device.

Figure 11:
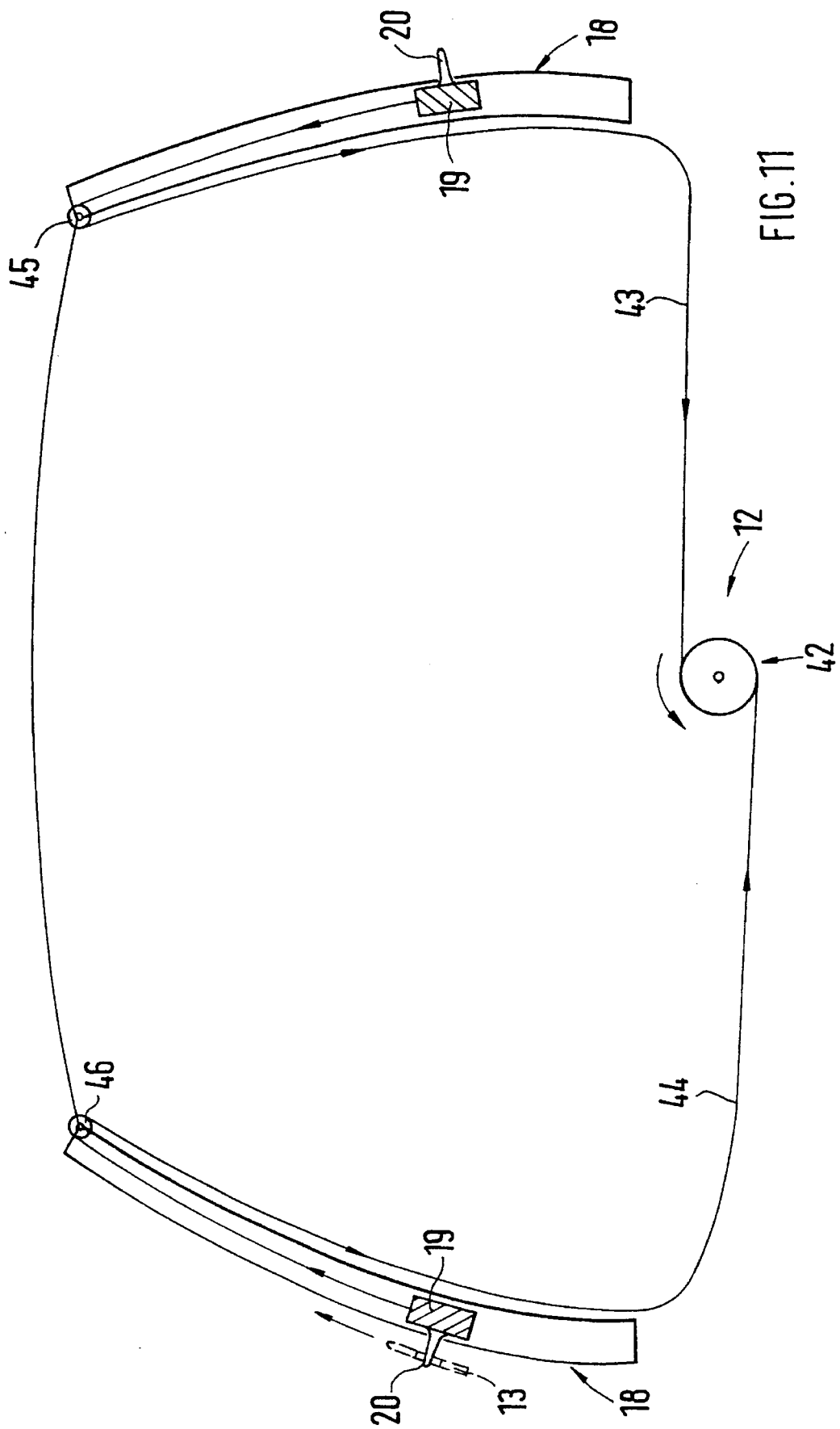
FIG. 11 is a front view of an embodiment of an activating device for the arrangement according to the present invention.

The activating device 12 is formed by a cable pull, a spring element, a servo mechanism, or the like, and interacts with the supporting strut 13, specifically with the end of the supporting strut 13 facing the windshield pillar 2 (FIG. 11). The activating device 12 is triggered by a sensor which is not shown in detail.

In its deposited position A, the supporting strut 13 is detachably fixed on a step-shaped impression 14 formed in the vehicle door 3 as shown in FIGS. 4 and 5. The step-shaped impression 14 faces the passenger compartment 9. The impression 14 is formed adjacent to the belt line 4 on the inside door panel 7 and comprises an upright section 15 and an adjoining lower horizontal section 16.

The supporting strut 13, which extends in the longitudinal direction of the vehicle, in its deposited position A, extends along a significant portion of the length of the vehicle door 3. As a result, when the vehicle door is closed, a forward flattened end 17 of the supporting strut 13 is in an operative connection with an angular sliding block 19 arranged inside a guide rail 18 as shown in FIG. 8.

Figure 8:
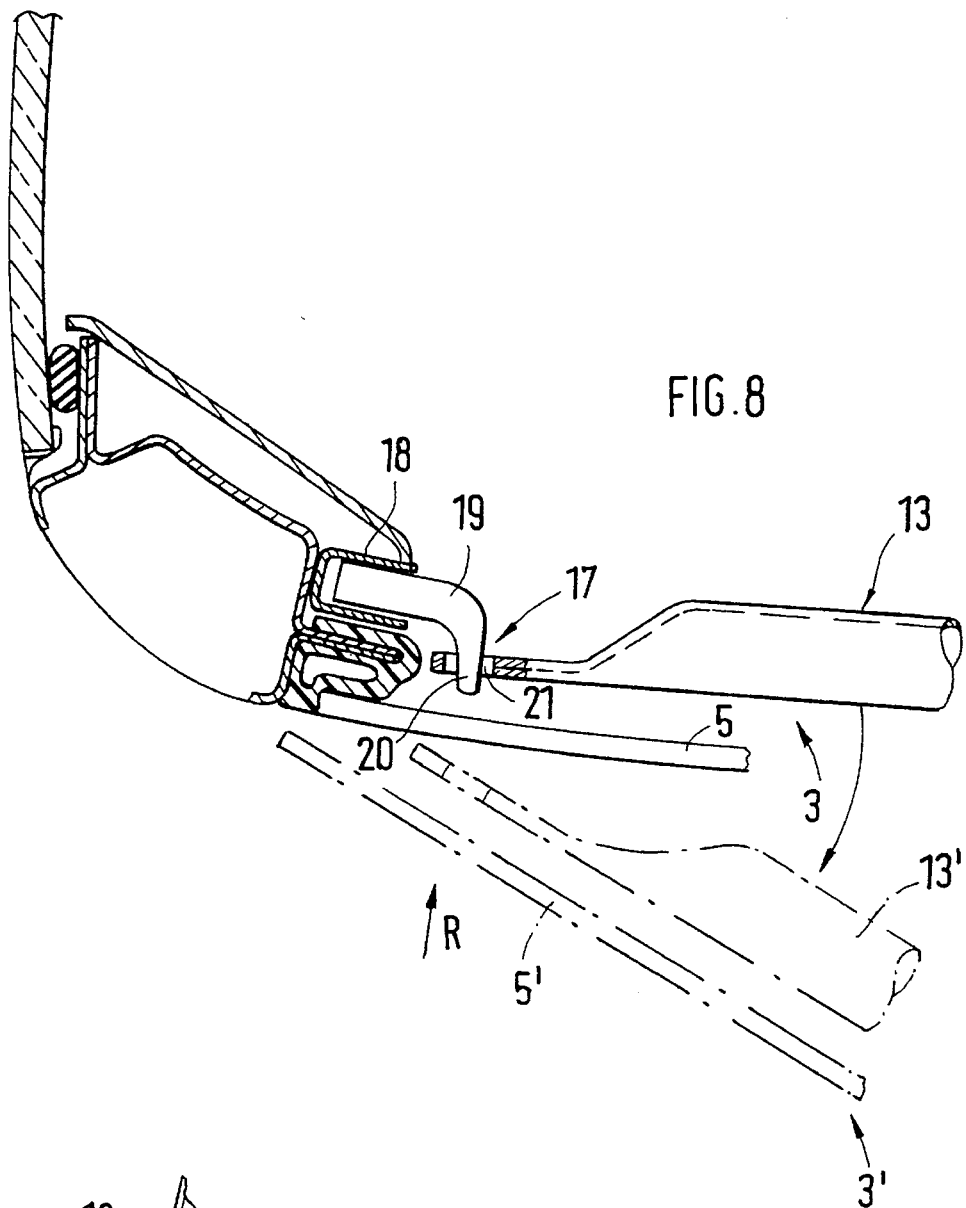
FIG. 8 is an enlarged sectional view, taken along Line VIII—VIII of FIG. 1.

Referring to FIG. 8, a leg 20 of the sliding block 19 projects in the transverse direction of the vehicle and toward the exterior of the vehicle. The leg 20 projects through an opening 21 of the flattened end area 17 of the supporting strut 13. When the vehicle door 3' is open, the supporting strut 13' is disengaged from the leg 20 of the sliding block 19 as illustrated by a dash-dotted line.

In the cross-sectional view, the guide rail 18 has an approximately C-shaped profile. As shown in FIG. 1, the guide rail 18 extends along the lateral windshield pillars 2 of the vehicle; specifically, a transversely extending upper pane frame 23 extends from a forward lower end arranged below the belt line 4 to an upper end area 22 of the windshield pillars 2, between the two laterally exterior upper end areas 22 of the windshield pillars 2.

Figure 2:
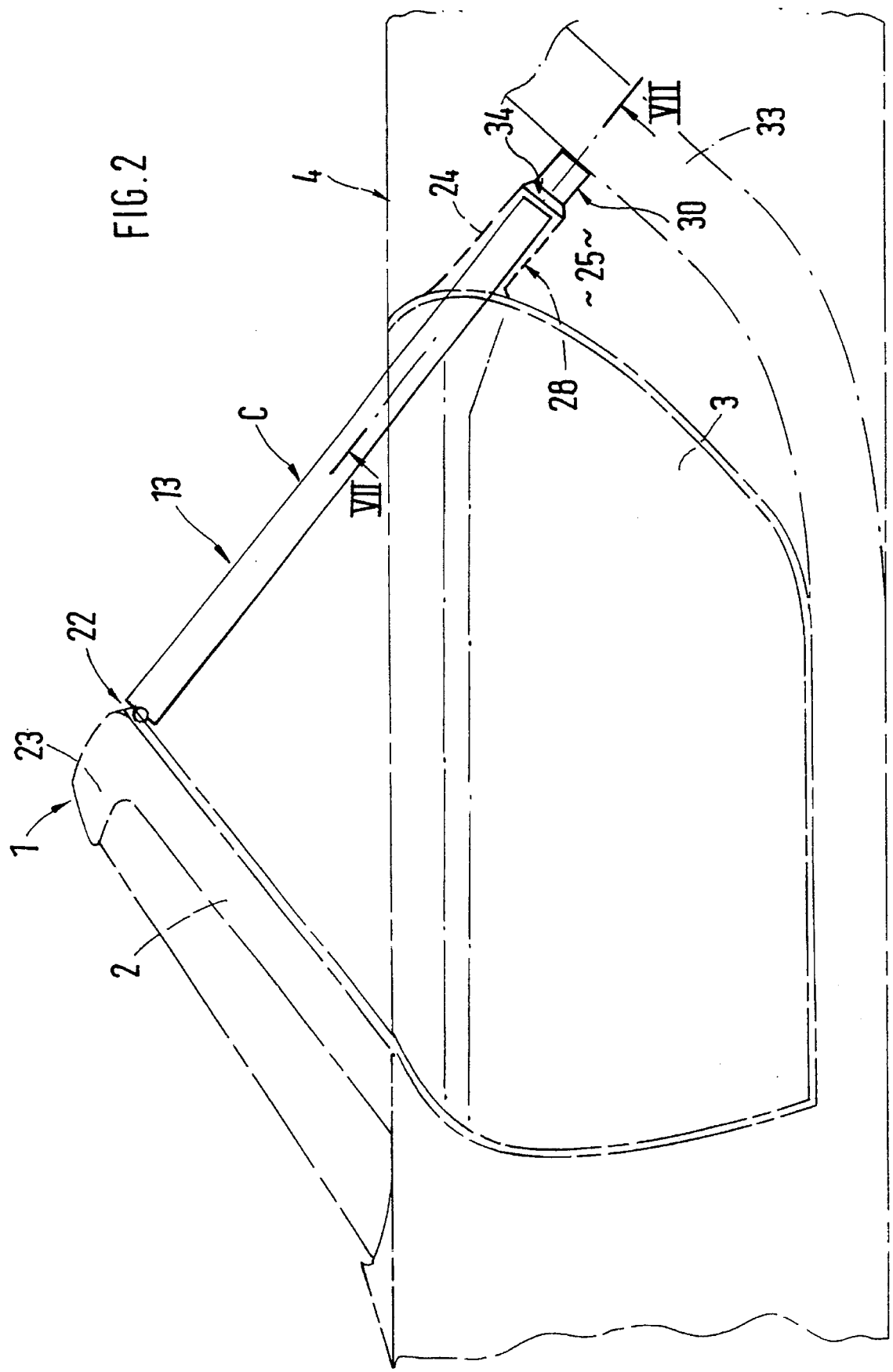
FIG. 2 is a partial lateral view of a motor vehicle with the arrangement for increasing the buckling strength of the windshield pillars being in a swivelled-up position C, in which a supporting strut of the arrangement engages in a first section of a body-side receiving device.
Figure 6:
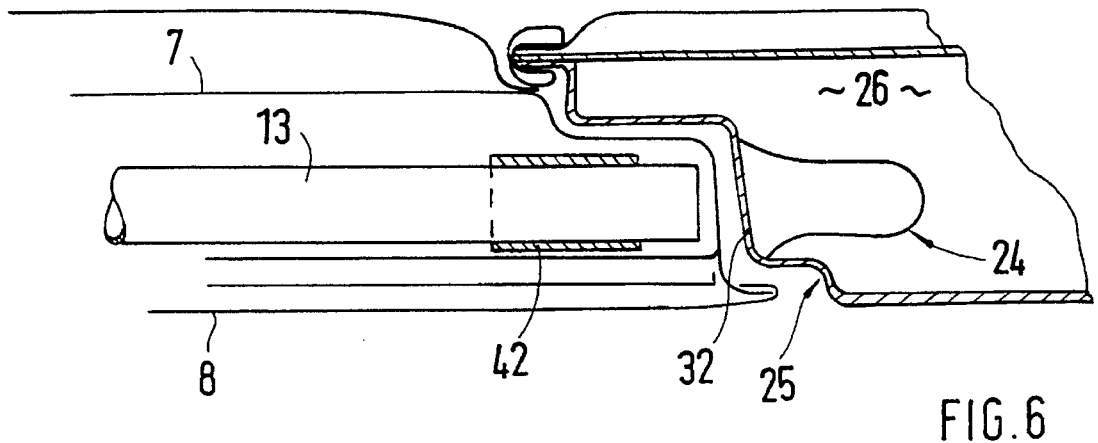
FIG. 6 is an enlarged sectional view, taken along Line VI—VI of FIG. 1.

In a swivelled-up position C (FIG. 2) and an operative position B (FIG. 3), the supporting strut 13 is completely uncoupled from the vehicle door 3 and, in the operative position B, is connected in a force-transmitting manner, on one side with the upper end area 22 of the windshield pillar 2 and, on the other side with a stationary receiving device 24 arranged adjacent to the vehicle door 3. Viewed in the driving direction, the receiving device 24 is arranged behind the vehicle door 3, specifically in the area of an upright B-pillar 25. According to FIG. 6, the receiving device 24 is mounted within a hollow space 26 of the B-pillar 25. However, it is also possible to arrange the receiving device 24 outside the hollow space 26 of the B-pillar 25, specifically on the side of the B-pillar 25 facing the passenger compartment 9.

Figure 7:
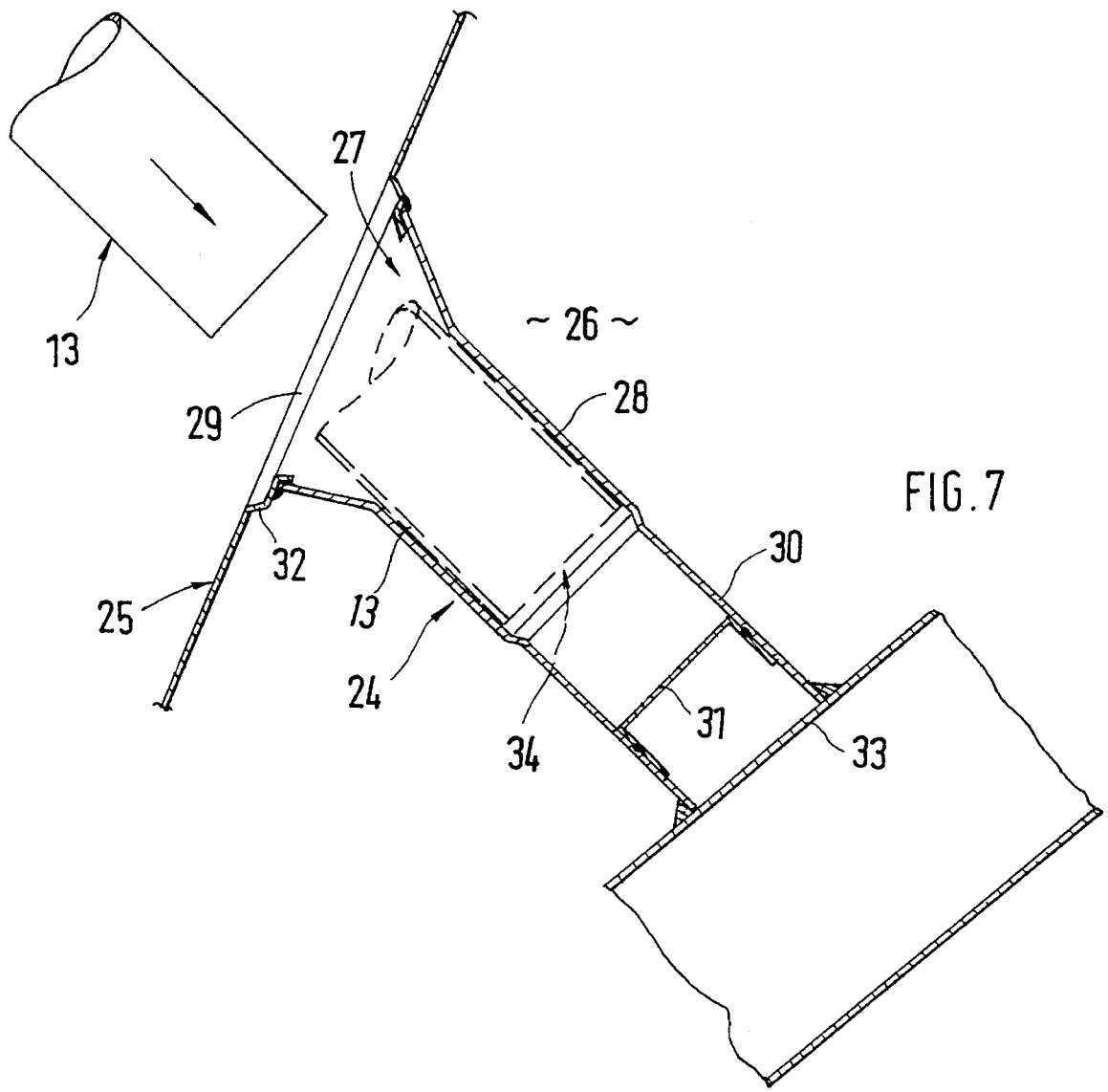
FIG. 7 is an enlarged sectional view, taken along Line VII—VII of FIG. 2.

Referring to FIG. 7, the receiving device 24 includes at least one first tube section 28 provided with a front-connected insertion opening 27 which is expanded in the shape of a funnel, a play fit being provided between the first tube section 28 and the outer contour of the supporting strut 13.

The insertion opening 27 on the B-pillar 25 is provided with a thin-walled covering 29 which is broken or pierced when the supporting strut 13 is inserted.

Viewed in the insertion direction of the supporting strut 13, a second tube section 30, which has a smaller inside diameter than the outside diameter of the supporting strut 13, adjoins the first tube section 28. In this case, in the area of the longitudinal course of the second tube section 30, an interior stop 31 is arranged which limits the penetrating movement of the supporting strut 13. According to FIG. 7, the receiving device 24 is connected on the one side with a transversely extending wall section 32 of the B-pillar 25 and, on the other side, with an exterior vehicle side rail 33. The connection may take place by means of welding, screwing, or the like. The exchangeability of the receiving device 24 is facilitated by a detachable connection.

In the event of danger, the end of the supporting strut 13 which faces the receiving device 24 is moved by the activating device 12 approximately to a rearward end 34 of the first tube section 28 of the receiving device 24. In the case of a spurious triggering of the system, the supporting strut 13 can be returned into its deposited position A in a simple manner as can be seen from FIG. 2, wherein the strut is only in an intermediate position C.

Figure 3:
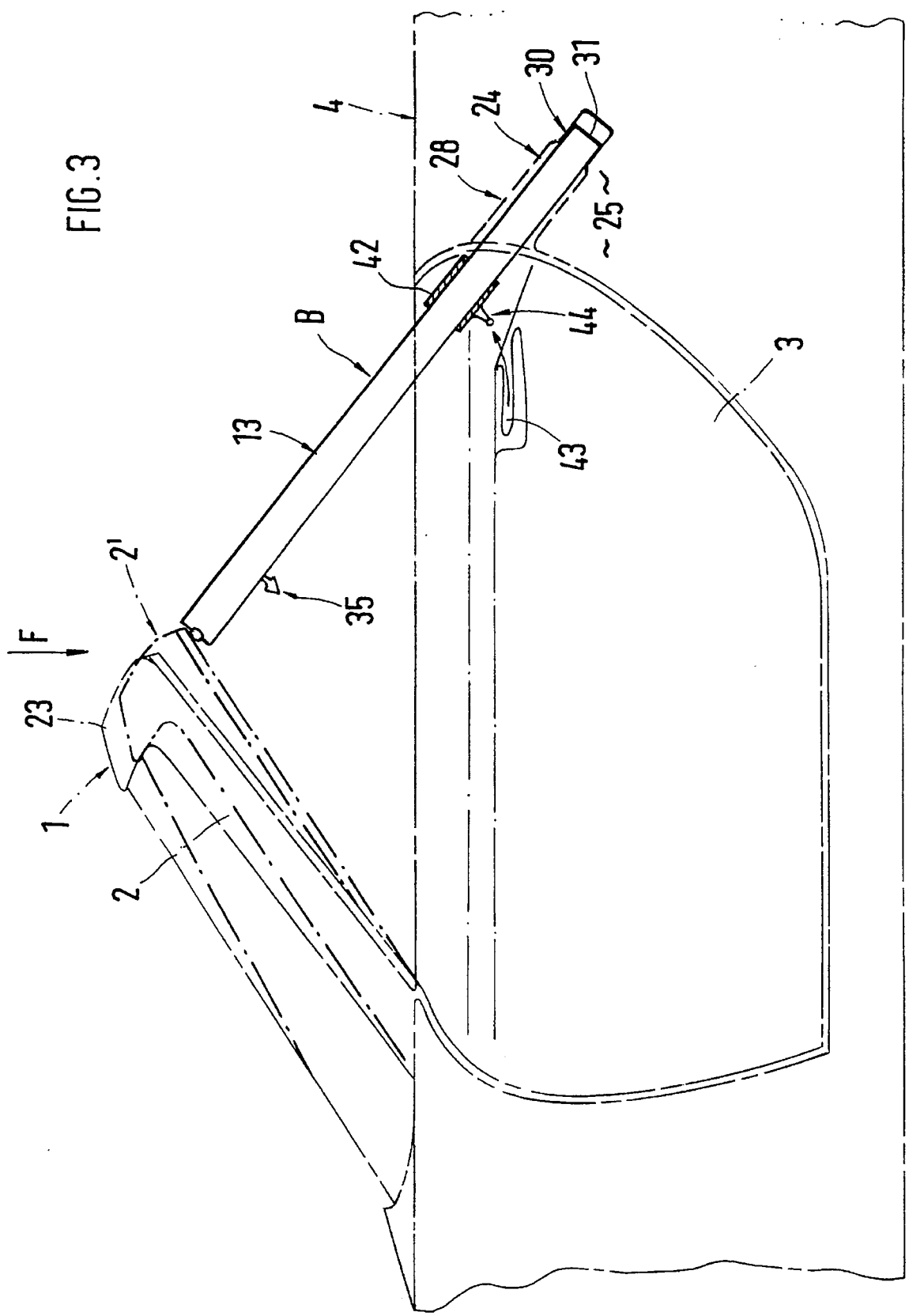
FIG. 3 is a partial lateral view corresponding to FIG. 2, but in the operative position B of the arrangement, in which case the supporting strut penetrates into a second section of the receiving device.

In the event of a vehicle rollover, resulting in a force F being applied from above onto the windshield pillar 2 as shown in FIG. 3, the windshield pillar 2 is moved into the position 2' which is represented by a dash-dotted line. At the same time, the supporting strut 13 is moved into the second tube section 30 of the receiving device 24. In this case, by means of the expansion of the second tube section 30, energy is absorbed in an effective manner. The penetrating movement of the supporting strut 13 is limited by the stop 31 within the second tube section 30 (see FIG. 3).

When the supporting strut 13 is displaced from its deposited position A into the C-position or into the operative position B, the activating device 12 will move the frontal end 17 of the supporting strut 13 upwards inside the guide rail 18. In this case, the supporting strut 13 detaches from the inside door panel 7.

When the supporting strut 13 is swivelled upwards about the rotatably disposed rearward guiding device 36 (FIG. 1), the supporting strut 13 is displaced in the guiding device 36 toward the rear or downward in the direction of the receiving device 24. The receiving device 24 is an extension of the supporting strut 13. The guiding device 36 is formed by a sliding sleeve 42 which surrounds the supporting strut 13 and which interacts with a connecting link guide 43. In the swivelled-up position C or the operative position B, a base section 44 of the sliding sleeve 42 is disengaged from the connecting link guide 43 arranged on the door-side.

As soon as the rearward end of the supporting strut 13 engages in the receiving device 24, the supporting strut 13 will be uncoupled from the vehicle door 3.

Figure 9:
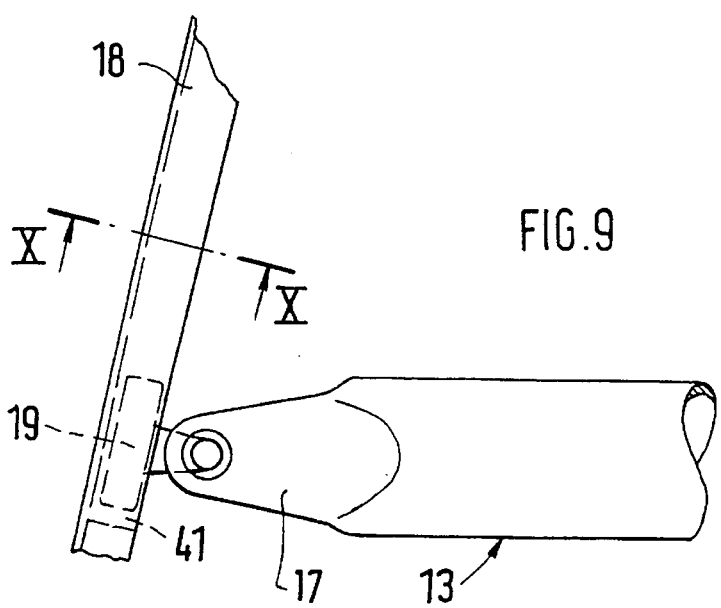
FIG. 9 is a view of FIG. 7 taken in the direction of the arrow R.
Figure 10:
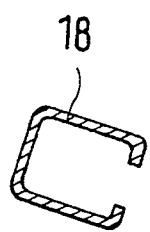
FIG. 10 is a sectional view of FIG. 9, taken along Line X—X.

As shown in FIG. 9, a sliding block 19 is inserted into the C-shaped guide rail 18 and is guided therein in a slidable manner. A stop 41 defines the lower end position of the sliding block 19 in the guide rail 18.

According to FIG. 4, the supporting strut 13 is formed by an elongated tube which is flattened at the forward end 17 and which is held locally in position in a detachable manner on the inside door panel 7. This may take place by clips 35 (FIG. 3), Velcro fasteners or the like.

In its deposited position A, the supporting strut 13 is covered by a swivellable upper section 37 (FIG. 4) of the interior door lining 10. When the activating device 12 is triggered, this swivellable section 37 is moved about the lower axis of rotation 38 toward the interior in the direction of the passenger compartment 9 and the supporting strut 13 is then changed into its C-position.

According to a second embodiment shown in FIG. 5, the supporting strut 13 is formed by a tube 40 provided with a shell 39. The shell 39 is adapted to the shape of the step-shaped impression 14 and to the contour of the interior door lining 10. In the case of this embodiment, the supporting strut 13 forms an upper end area of the interior door lining 10 or a key strip of the vehicle door 3. The shell 39, which is formed by a foamed material or the like, is adapted to the surface contour of the interior lining.

On the upper end area 22 of the windshield pillar 2, in the transition area to the transversely extending upper pane frame 23, a locking device is provided which is not shown in detail and which connects the supporting strut 13 in its operative position B in a force-transmitting manner with the windshield pillar 2. The locking device may be formed by a bayonet catch, a hook catch or the like (not shown in detail).

FIG. 11 illustrates an activating device 12 which in the embodiment is constructed according to the principle of a belt tightener and includes a central retracting mechanism 42, traction ropes 43, 44 and deflecting elements 45, 46.

At one end, each of the two traction ropes 43, 44 are firmly connected with the sliding blocks 19, whereas the other ends of the traction ropes 43, 44 interact with the retracting mechanism 42. When the sensor is triggered in the event of a vehicle rollover, the retracting mechanism 42 is activated, and the sliding block 19, which is in an operative connection with the supporting struts 13, is moved upwards in the guide rail 18 to an upper end area 22 of the windshield pillars 2. In the upper end position, the sliding block 19 and the supporting strut 13 are fixed by the locking device.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An arrangement for increasing the buckling strength of windshield pillars of a vehicle having a lateral vehicle door, comprising:

at least one supporting strut;

an activating device, said at least one supporting strut interacting with said activating device and extending approximately in a longitudinal direction of the vehicle, said supporting strut being aligned approximately horizontally in a deposited position and extending in an upper area of the lateral vehicle door having an inside door panel;

a guide rail located on the windshield pillar, wherein an end of the supporting strut facing the windshield pillar, in a danger event, is moved upwards by said activating device along the guide rail to an upper end area into an operative position;

an impression formed in the vehicle door facing a passenger compartment, said supporting strut being detachably fixed on said impression in a deposited position;

wherein said supporting strut is completely uncoupled from the vehicle door in a swivelled-up position and said operative position; and a receiving device arranged adjacent to the vehicle door and being fixed at a body side of the vehicle, wherein in said operative position said supporting strut is connected on one side in a force-transmitting manner with the upper end area of the windshield pillar and, on the other side, with said receiving device.

2. An arrangement according to claim 1, further comprising:

a sliding block arranged within the guide rail; and a swivellable guiding device, wherein the supporting strut extends along a substantial portion of a length of the vehicle door in the deposited position, a forward end of the supporting strut, being in an operating connection with said sliding block while the vehicle door is closed, and a rearward end of the supporting strut being detachably connected with the inside door panel by way of said swivellable guiding device.

3. An arrangement according to claim 1, wherein the supporting strut is formed by a continuous tube which is held locally in position on the inside door panel in a detachable manner, and further comprising a swivellable section of an interior door lining for covering the supporting strut in its deposited position.

4. An arrangement according to claim 1, wherein the supporting strut comprises a tube provided with a shell, the shell being adapted approximately to a shape of said impression of the vehicle door and in sections to a contour of an interior door lining for said vehicle door.

5. An arrangement according to claim 1, further comprising a locking device provided on the upper end area of the windshield pillar, said supporting strut being fixedly connected in its swivelled-up position and in the operative position with the windshield pillar via said locking device.

6. An arrangement according to claim 1, wherein in a danger event, the supporting strut is moved upwards by the activating device along the guide rail of the windshield pillar and, in this case, is swivelled upwards about the guiding device, and in that, at the same time, a rearward end of the supporting strut is moved downwards into said receiving device arranged in an area of a B-pillar, said rearward end interacting with said receiving device in a supporting manner.

7. An arrangement according to claim 6, wherein the receiving device is mounted inside a hollow space of the B-pillar.

8. An arrangement according to claim 6, wherein the receiving device is provided on a side of the B-pillar facing the passenger compartment.

9. An arrangement according to claim 1, wherein the receiving device comprises at least one first tube section which is provided with a funnel-shaped insertion opening and which receives, in its C-position, an end of the supporting strut facing away from the windshield pillar, a play fit being provided between said one tube section and the inserted end of the supporting strut.

10. An arrangement according to claim 9, wherein a second tube section, viewed in the insertion direction of the supporting strut, adjoins the first tube section, said second tube section having a smaller inside diameter than an outside diameter of the supporting strut; and a stop for the supporting strut being provided in the area of the second tube section.

11. An arrangement according to claim 1, wherein in the deposited position when the door is closed, the supporting strut acts as a door reinforcement in the event of a side crash.

12. An arrangement according to claim 11, wherein the end of the supporting strut facing the receiving device, in the event of danger, is moved by the activating device approximately to a rearward end of the first tube section of the receiving device, and in that, when a force is applied from above onto the windshield pillar, the end of the supporting strut facing the receiving device is moved into the second tube section while energy is absorbed, the penetrating movement being limited by the stop.

\* \* \* \* \*